May 31, 1938.　　　A. G. REDMOND　　　2,118,983
SECTIONAL POWER UNIT
Filed Dec. 5, 1934　　　3 Sheets-Sheet 1
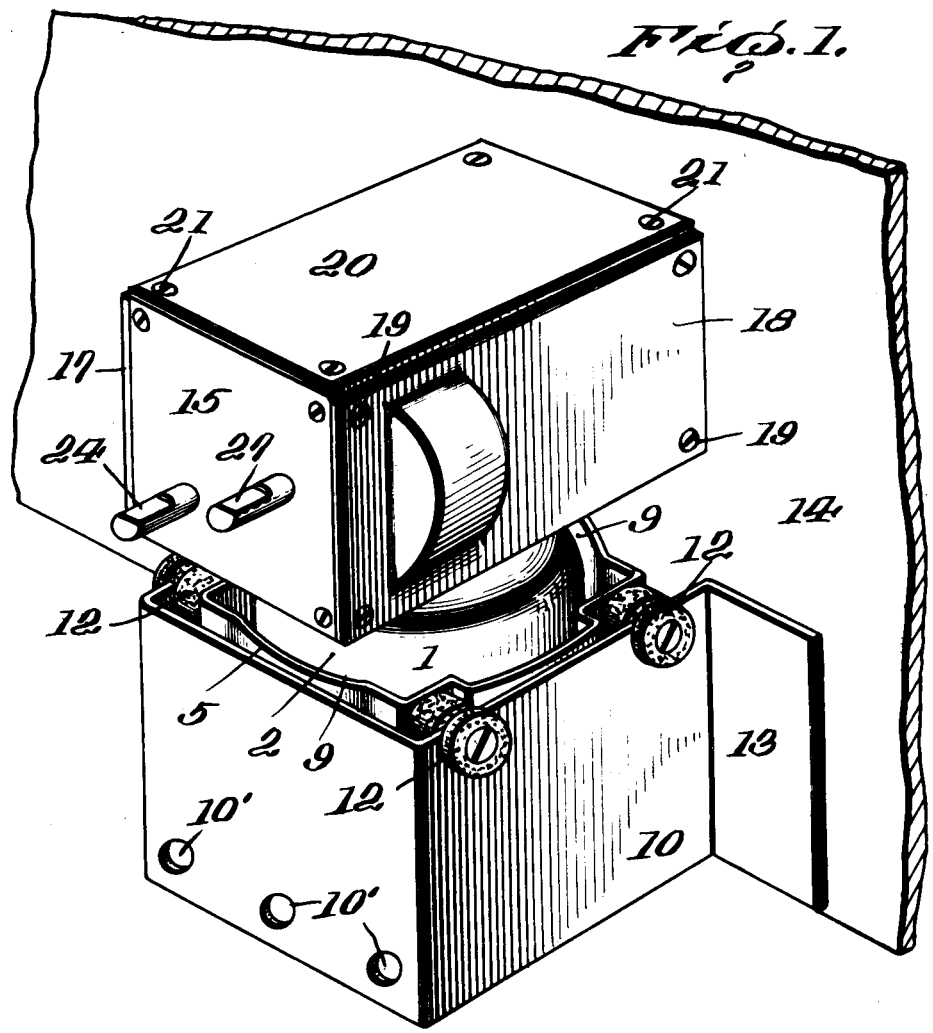
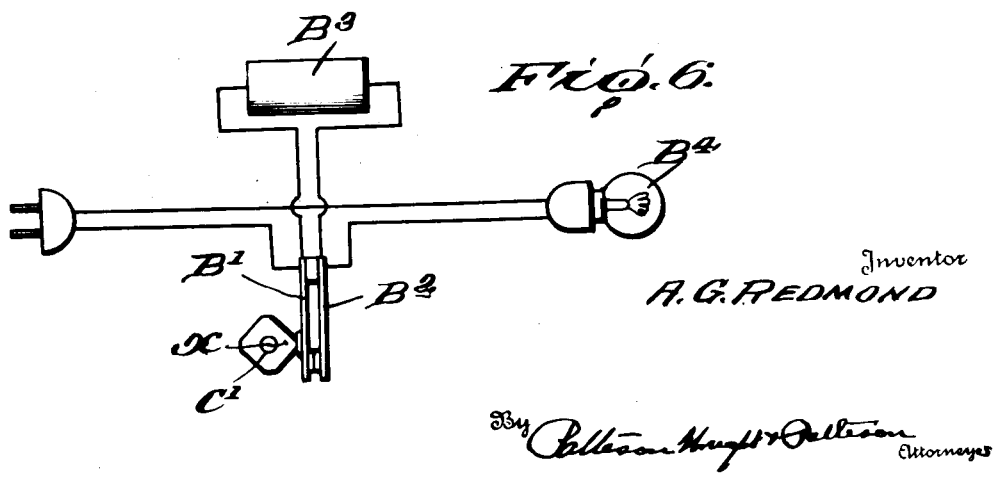
Inventor
A. G. REDMOND

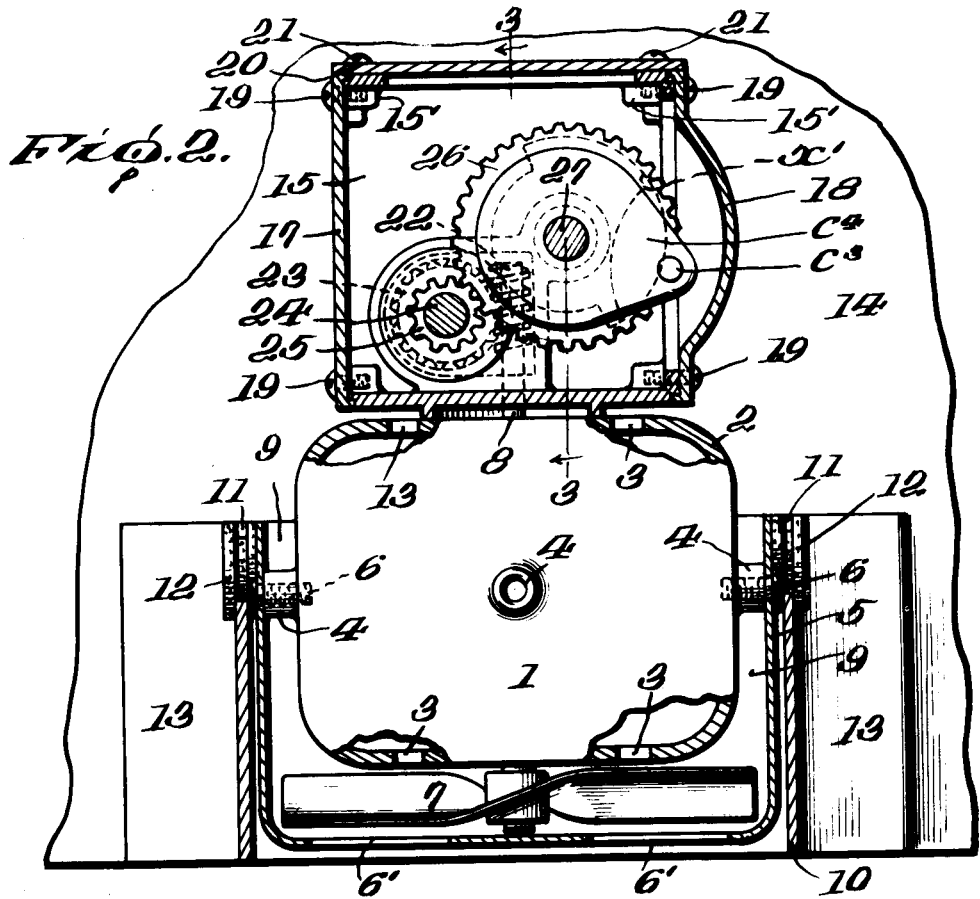
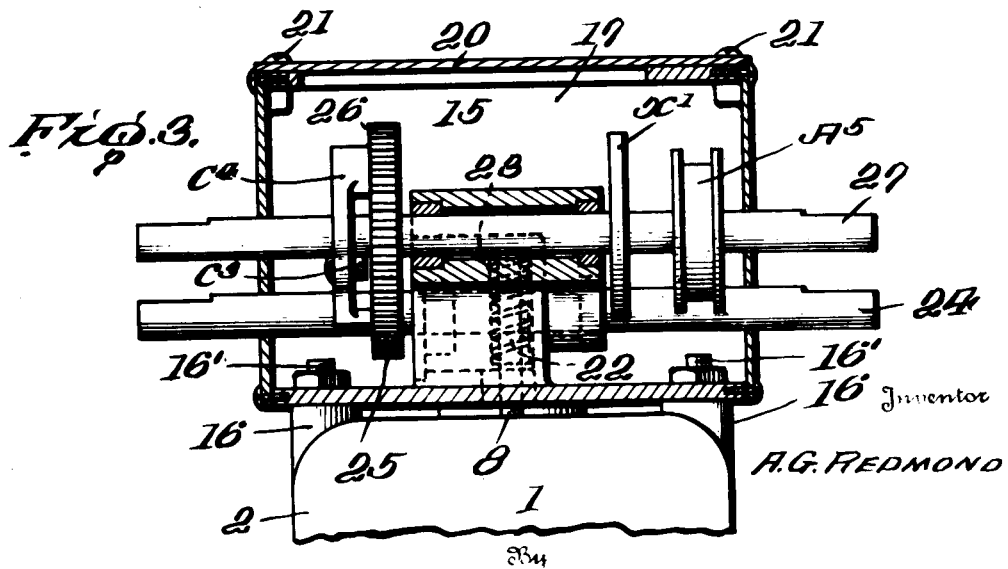

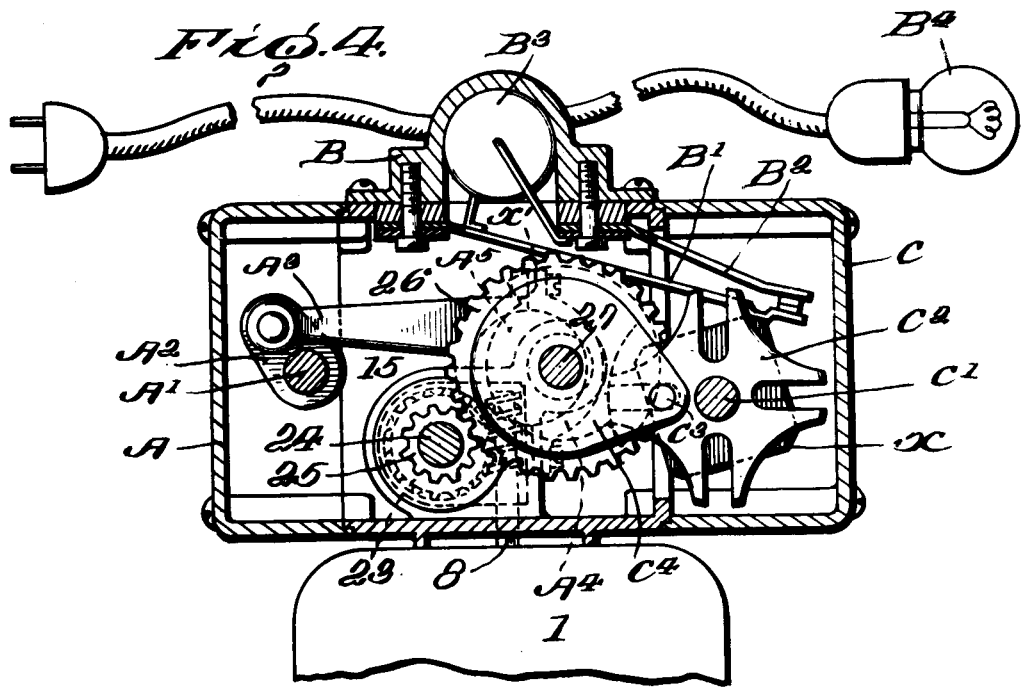
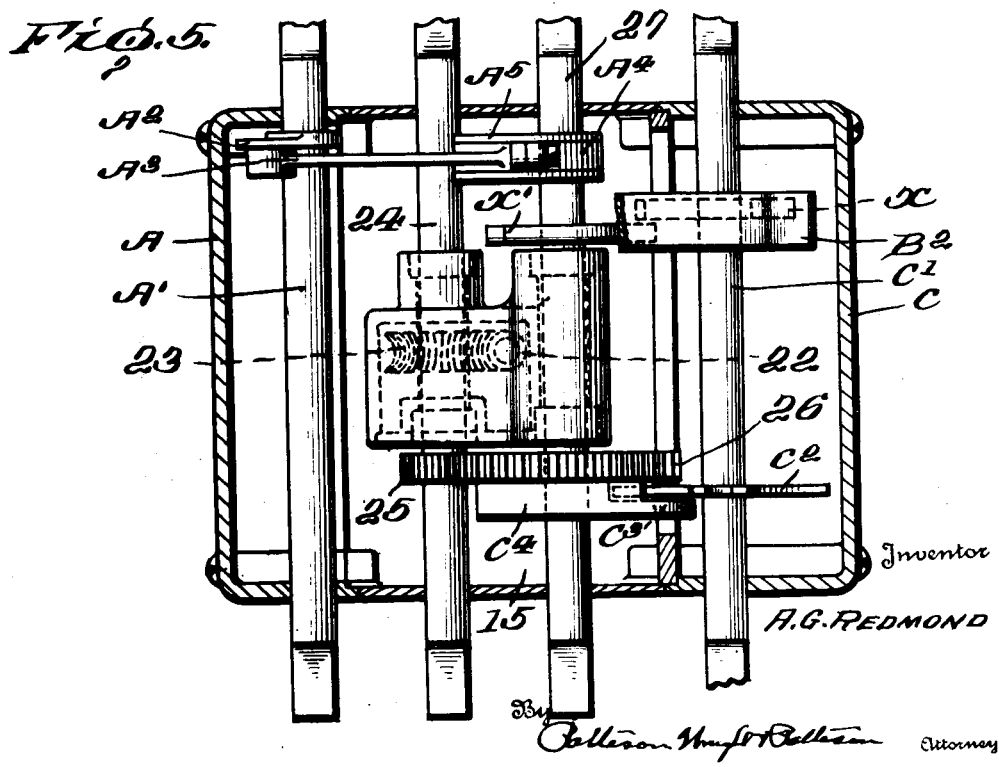

Patented May 31, 1938

2,118,983

UNITED STATES PATENT OFFICE 2,118,983

SECTIONAL POWER UNIT

Albert G. Redmond, Flint, Mich.

Application December 5, 1934, Serial No. 756,169

7 Claims. (Cl. 74—16)

This invention relates to a sectional power unit especially adapted to be used in connection with advertising devices employing movable elements, the object being to provide a power unit with a central power shaft driven by an electric motor, and from which can be driven an oscillating shaft carried by a detachable section and from which can be driven a shaft having an intermittent rotary movement carried by a detachable section, whereby the power unit can be sold in sections so that the purchaser can buy only the units required to produce the particular motions desired to be obtained in driving any given advertising device, thereby saving the expense of having to buy the power unit wherein all of the different movements above specified are driven continuously.

Another object of the invention is to provide a detachable flasher which can be used in connection with the central power unit or any of the detachable sections.

A still further object of the invention is to provide a sectional power unit which is very compact in form, and in which the central unit is provided with two driven shafts adapted to rotate at different speeds, whereby the members to be driven can be connected to either shaft or both.

A still further object of the invention is to provide a novel construction of motor for driving the power unit, said motor being provided with cooling means for preventing the motor from becoming over-heated.

With the construction of power units herein shown and described all of the driven shafts when the various units are assembled are driven by an electric motor, whereby movement will be imparted to the various shafts. The sectional units being so constructed that they can be readily attached or detached, and when detached, the power unit will be composed of a central casing having a pair of driving shafts extended through the ends thereof, whereby members to be driven can be attached to either end of the shafts.

With the construction of power units herein shown and described, power for driving shafts is obtained by the use of an electric motor. However, certain advantages are obtained by the use of various kinds of motors such as spring, hydraulic, vacuum or pneumatic. These motors may be used where electrical energy is not available or convenient. The spring motor would be the most probable substitute for an electric motor. It may be of the manually wound or electrically wound type. The use of the manually wound spring motor is given above. The electrically wound spring motor may be used advantageously where: (1) Power failures are frequent and continuous operation is desired. (2) Extremely quiet operation is desired. (3) Available supply of electrical energy is limited and dry or wet cell batteries must be used. (4) Adjustable speeds of each motion is desired. For this reason, I do not wish to limit myself to the use of an electric motor as a source of power.

A still further object of the invention is to provide a construction of power unit which is exceedingly simple and cheap to manufacture and one in which either the section containing the oscillating shaft or the section containing the intermittently rotating shaft or both can be detached in connection with the flasher, whereby these parts will not be subject to wear continuously when not in use.

A still further advantage of the invention is to supply a power unit with no radio interference.

A still further object of the invention is to provide a section power unit with both ends of the various shafts extending through the casing whereby it is possible to drive two members from the same shaft and maintain their movements in synchronism or to drive one member in either direction of rotation from each shaft by attaching to the proper end of the shaft.

A still further advantage of the invention is to provide a section power unit in which the power motor is detachable and thus permits the use of the most efficient type and size of motor for various applications and for various kinds of available power.

I am aware that prior to my invention, power units have been constructed in which a casing enclosed a motor for driving a plurality of shafts having various movements, but in these prior constructions all of these driven shafts rotate continuously when the motor is in operation, so that they are all subject to the same amount of wear, whether or not the power is being taken from one or more of the shafts and therefore, I do not wish to claim broadly a power unit having means for converting rotary motion into other motions as my invention relates to a sectional power unit in which a central power unit contains primary means for driving shafts in connection with detachable units containing shafts which are driven by suitable driving mechanism from the primary shaft for converting rotary motion into the various motions desired.

Other and further objects and advantages of the invention will be hereinafter set forth and the novel features thereof defined by the appended claims.

In the drawings,

Figure 1 is a perspective view of a power unit construction in accordance with my invention, illustrating the same in position to be used in connection with an advertising sign;

Figure 2 is a vertical section, partly in elevation;

Figure 3 is a section taken on line 3—3 of Figure 2;

Figure 4 is a vertical section of the casing of the driving unit showing the two additional sections attached in connection with a flasher, whereby a pair of parallel shafts can be driven at different rates of speed, and an oscillating shaft carried by one of the sections, and an intermittently rotating shaft carried by another section to be driven from the main driving shaft and the flasher will be operated;

Figure 5 is a section taken on line 5—5 of Figure 4; and

Figure 6 is a diagrammatic view of the flasher.

In carrying out my invention I employ an electric motor 1, which is of the ordinary construction now in use, and is enclosed in a housing 2, which is provided in its tops and bottoms with openings 3.

The housing is provided with a radially extending portion 4, over which is arranged the casing 5 secured thereon by screws 6, said casing being provided in its bottoms with slots 6, through which air is adapted to be drawn by fan 7, carried by the motor shaft 8, which fan forces air through the openings 3 to keep the interior of the motor cool, and air through the passages 9 surrounding the housing formed by the casing whereby the cooling system for the motor is provided for maintaining the motor in a cool condition.

A support 10 is provided for the motor and is rectangular in shape having slots 11 to receive the resilient supporting members 12 carried by the casing 5, said support being provided with flanges 13, which are connected to the advertising device 14 in any suitable way. The support is provided with openings 10' to allow air to enter the same so that the air will be drawn by the fan through the bottom of the casing and forced through and around the electric motor.

While I have shown this particular manner of mounting the motor, of course, I am aware that other means can be employed, but this means provides not only means for mounting the motor, but means for mounting advertising signs in such a position that the moving parts thereof can be readily operated by the power unit as will be hereinafter fully described.

Disposed on the top of the housing 2 is a rectangular power unit casing 15, which is supported on bosses 16 of the casing 2 and secured thereto by bolts 16' for holding the casing above the housing 2 in order to allow the air to pass out of the openings 3 as clearly shown in Figure 2, and said power unit casing is provided with removable sides 17 and 18, held in position by screws 19 working in bosses 15', whereby either one or both of said sides can be removed in order to allow one or more sections to be attached as will be hereinafter fully described.

The housing is also provided with a detachable top 20 held in position by screws 21 working in suitable threaded bosses, whereby the top of the housing can be removed and a flasher unit attached, all of which will be hereinafter fully described.

The motor shaft 8 projects up through the bottom of the power unit casing 15 and carries a worm 22, which in turn meshes with a worm wheel 23 carried by a shaft 24, which is mounted in suitable bearings in the housing, and has its ends extending through suitable openings formed in the ends of the power unit casing as clearly shown in Figure 5.

The shaft 24 carries a pinion 25 which meshes with a gear 26 fixed on a shaft 27 mounted in suitable bearings, and having its ends extending through the end walls of the power unit casing as shown in Figure 5.

The worm wheel, pinion, and gearing form a reduction gearing between the motor shaft and the shafts 24 and 27, whereby the shafts 24 and 27 will be rotating at different speeds.

Units A, B, and C are adapted to be connected to the central power unit casing 15 by removing the sides 17 and 18 and the top 20, and these units are so constructed that any one of them can be attached to the central power unit casing 15 by removing the screws employed for attaching the same, and by using longer screws to secure these units in position.

The unit A comprises a rectangular casing conforming in shape to the end of the casing 15 and has a shaft A' mounted therein, the ends of which extend outwardly through the ends of the casing as clearly shown in Figure 5.

The shaft A' carries a crank arm A² to which is pivotally connected a pitman rod A³ carried by an eccentric strap A⁴ surrounding an eccentric A⁵ fixed on a shaft 27, whereby the shaft A' will be oscillated as the shaft 27 is rotated, so as to convert a rotary motion into an oscillatory motion.

In order to attach the unit A to the central power unit, the screws employed for fastening the plate 17 are removed and the plate 17 is detached. The unit A is then placed into position on the central power unit with the eccentric strap in position around the eccentric, which is permanently fixed on the shaft 27. This can be readily accomplished as the eccentric strap can be placed in position and the pitman rod can then be placed over the pin used for pivotally connecting the crank A², and while I have shown this particular manner of connecting this unit to the central power unit, I do not wish to limit myself to any particular manner of connecting this unit with its driving connection, as I am aware that various changes can be made without departing from the spirit of my invention.

After the driving connection has been formed between the shaft A' and the shaft 27, and the unit A has been positioned on the central power unit, screws of a greater length than that employed to fasten the plate 17 are used for fastening the unit A in position, the screws working in the same bosses as the screws employed for fastening the side plate. This forms a complete unit carrying with it the pitman rod, and the eccentric strap so constructed that the purchaser of unit A can readily attach the same to the central power unit when he desires to convert a rotary motion into an oscillating movement.

When it is desired to attach the unit C, side plate 18 is removed and the unit C attached thereto by employing longer screws in a similar manner as that employed in attaching unit A.

Unit C carries a shaft C', which is adapted to be rotated intermittently by what is known as the "Geneva" movement, and comprises a star wheel C² fixed on the shaft C' having slots to receive a pin C³ carried by disc C⁴ fixed on the shaft 27, and it will be apparent that this unit can be readily attached or detached from the central unit. In attaching the unit C, it is only necessary to turn the star wheel C² into such a position that one of the slots will be in such a position that the pin C³ of the disc C⁴ will lead into one of the slots of the star wheel as the sections are united, which forms a driving connection between the shaft 27 and the shaft C' so as to rotate the shaft C' intermittently as the shaft 27 is revolved.

The ends of the shaft C¹ project through the ends of the casing C of the power unit as shown in Figure 5 to provide means for attaching a driving connection to either end thereof.

A distorted disc X' is secured to the shaft 27 for operating the circuit maker and breaker of the flasher B when neither of the detachable sections are connected.

The shaft C¹ also carries a rectangular disc X for operating an electric circuit maker and breaker of the flasher B, when attached thereto. The disc X may also be fastened to shafts C¹, A¹, or 27 to operate the circuit maker and breaker to give the same results.

In attaching the flasher B to the central power unit casing, the top 20 is removed, and the flasher B is attached thereto.

The flasher B is provided with a circuit maker and breaker composed of a pair of flexible arms B¹ and B², the arm B¹ being adapted to be engaged by the rectangular disc X or the disc X' as the case may be, so as to move it in contact with the arm B² to complete the circuit as the disc X rotates, whereby the circuit will be intermittently made and broken.

The arms B¹ and B² are arranged in an electric circuit from the source of electrical energy, not shown, to the bulb B⁴, whereby an electrical energy will be intermittently supplied to the electric bulb to cause flashes. A condenser B³ is electrically connected in parallel with arms B¹ and B². This is used to reduce arcing at the contact points which increases the contact life and eliminates radio interference.

While in the drawings I have shown details of construction, it is, of course, understood that I do not wish to limit myself to any particular construction of circuit maker and breaker and connections thereof to the source of electrical supply, as this forms no part of my invention, and I am aware that various changes can be made without departing from the spirit of my invention.

A circuit maker and breaker connected as herein shown and described is very durable, and the contact points are so constructed that a good contact is made as the points are brought into contact with one another as the disc X revolves.

This provides means for producing electric flashes as the shaft 27 is rotated so that flashes can be produced in connection with a sign provided with moving elements, and while I have shown certain details of construction, I do not wish to limit myself to these details as I am aware that various changes can be made without departing from the spirit of my invention.

With a sectional power unit herein shown and described, I provide a central power unit with a pair of shafts driven at different rates of speed from an electric motor which shafts have their ends extending through the ends of the casing so as to provide means for attaching either end to members to be driven, and by constructing the main driving shaft, 27, which rotates at a reduced speed, with an eccentric, a distorted disc, and a disc with a pin, I am able to attach a unit to one side of the main casing having means for engaging the eccentric shaft for converting rotary motion into an oscillatory motion, and by attaching the other unit to the other side of the casing, I convert continuous rotary movement to an intermittently rotary movement, and by attaching the flasher B, I am able to operate a circuit maker or breaker, and it will be apparent that any one of these units can be attached and that when all of them are in position, I provide a sectional power unit in which rotary motion can be converted into the other motion as well as to operate a flasher.

It is also apparent that the attaching or detaching of any one of the units, A, B or C does not affect the operation of the main unit or of the operation of any of the other units for each unit has a distinctly separate driving unit. For this reason, any unit or any combination of units may be used with the main power unit.

I am aware that various attempts have been made to produce a power unit to drive various kinds of machinery and devices, but so far as I am aware I am the first in the art to provide a sectional power unit in which a driven shaft is driven through a reduction gear from a motor shaft and carries members which are capable of being connected to members carried by detachable units for converting rotary motion into other motions, therefore I do not wish to limit myself to the exact construction and manner of forming these various units, as I am aware that it can be changed without departing from the spirit of my invention.

From the foregoing description it will be apparent that a sectional power unit has been produced which will meet the demands of the public for small units to drive various devices for the sectional units which will be sold in sections so that the purchaser can buy one or more of the units to drive the various devices which are to be driven.

While my invention is particularly adapted for driving advertising devices using moving elements, I am aware that it can be used for other purposes without departing from the spirit of my invention.

My device is compact in form and discloses a novel construction of an electric motor with cooling means for preventing the same from becoming over-heated in operation.

My improved construction of a sectional power unit is especially adapted to be used in connection with display devices, and when all the units are assembled, I provide a device which gives four distinct motions, namely, oscillating, indexing, slow rotating and fast rotating; which motions may be in timed relation with each other and in addition to these motions, I provide a flasher which may be attached to the main casing and operated by either the shaft which produces the indexing motion or the slow rotating shaft, so that a very novel device is produced, which is detachably mounted in a supporting member, which member forms also a support for the display device, and by forming display devices with supports of this kind, the same device can be substituted from one display device to another, and by having the shafts arranged parallel with one another and projecting outwardly from the ends of the respective casings, purchaser of such a device can readily connect it up with the various movable elements to be operated and therefore produce many designs.

By having the power taken off the electric motor by a worm and worm wheel, and connecting the two main shafts by reducing gearing, shafts are provided which rotate at different speeds, one of which shafts drives the shafts of the additional units, and as the motor is provided with means for maintaining it in a cool condition, a construction of device is provided which is exceedingly simple to manufacture and very durable in operation.

While I have not shown a display device in detail, as this device is adapted to be used in connection with all kinds of display devices, it will be apparent that by forming the main casing with detachable sides and a detachable top any one of the separate units can be attached or detached, so as to convert a power unit which is provided with means for driving shafts at different rates of speed, into a power unit with an indexing motion, an oscillating motion, as well as to provide means to operate a flasher, which will all be in timed relation with the shaft of the device, the device is simple to unite as the sections are so connected together that when a section is added or removed, none of the main driving shafts are interfered with, and the device is what is known as fool-proof, and meets a great demand for a power unit driven by a motor, and means for converting rotating motions into other motions.

It will also be apparent that other motions may be obtained with a section power unit by modifications of the movements already described such as converting the oscillating radial motion into oscillating linear motion by use of a cable or rod attached to the oscillating shaft. But all motions may be reduced to the four fundamental motions which have been thoroughly discussed and there would be nothing new in the use of these modifications. Therefore, I do not wish to limit myself to these four fundamental motions, but include other modifications which may be reduced to these.

In the drawings I have illustrated a sectional power unit driven by an electric motor, and I wish it to be clearly understood that I do not wish to limit myself to the use of any particular kind of motor, as I am aware that a spring motor could be used, and an electrically wound spring motor, a pneumatic motor, a hydraulic motor, a steam actuated motor or any other kind of motor desired without departing from the spirit of my invention; although, in practice I have found that many advantages are obtained by using an electric motor constructed in accordance with my invention, where electric energy can be obtained.

I am also aware that a sectional power unit could be provided having means for producing other motions than those described for operating movable elements of a display device and other devices, and that my invention consists broadly in providing a housing with a pair of shafts driven at different rates of speed from a motor, and provided with movable walls to enable casings carrying shafts with means operatively connected to be driven by the shafts of the housing for operating various devices, therefore, I do not wish to limit myself to the number of shafts employed or the number of sections carrying different forms of driving means, as I am aware that various changes can be made without departing from the spirit of my invention.

By providing the shaft 27 and the shaft $C^1$ each with a member for operating the circuit maker and breaker, it is only necessary to bend the arms $B^1$ and $B^2$ downwardly when it is desired to operate the same by the cam disk X when the section C is removed.

What I claim is:

1. In a sectional power unit, a motor having a shaft, a main casing provided with a pair of shafts driven continuously at different rates of speed by the shaft of the motor, each shaft projecting outwardly from the casing to provide a driving connection therewith, an auxiliary casing adapted to be detachably connected to the main casing, a shaft journaled in the auxiliary casing parallel with one of the shafts of the main casing and extending outwardly beyond said casing to provide a driving connection therewith and means carried by the shaft of the auxiliary casing detachably connected to be oscillated by one of the shafts of the main casing when said casing sections are connected together.

2. In a sectional power unit having a motor provided with a rotating shaft, a main casing provided with a pair of shafts adapted to be driven continuously at different rates of speed from the motor shaft, each shaft projecting outwardly from the casing to provide a driving connection therewith, an auxiliary casing adapted to be detachably connected to the main casing, a shaft journaled in the auxiliary casing parallel with the shafts of the main casing and extending beyond said casing to provide a driving connection therewith and means carried by the shaft of the auxiliary casing detachably connected to one of the shafts of the main casing and adapted to be intermittently rotated therefrom when said casings are assembled.

3. A sectional power unit comprising an electric motor provided with a vertically disposed shaft, a main casing disposed above said motor into which said shaft extends, a worm fixed on said shaft, a pair of parallel arranged shafts journaled in said casing and projecting outwardly therefrom at the ends to provide a driving connection therewith, said shafts carrying meshing gears forming a driving connection to drive said shafts at different rates of speed, a worm wheel carried by one of said shafts meshing with said worm, a disc carried by the other of said shafts provided with a pin, an auxiliary casing adapted to be detachably connected to the main casing, a shaft journaled in the auxiliary casing parallel with the shaft of the main casing and projecting outwardly therefrom to provide a driving connection therewith and a star wheel fixed on the last mentioned shaft adapted to cooperate with the pin of said disc for operatively connecting said shafts for imparting an intermittent rotary movement to the shaft of the auxiliary casing when said casings are assembled.

4. A sectional power unit composed of three box-like casings capable of being arranged along the side of one another, the central casing having removable sides, the end casings being provided with openings adapted to register with the open sides of said casing when the removable sides are detached to form a sectional oblong casing, a plurality of parallel arranged shafts disposed in said casings and extending out the ends thereof to provide driving connections therewith, two of said shafts being arranged in the central casing and adapted to be continuously rotated at different rates of speed, one of the first mentioned shafts being arranged in each of said casings and means on said continuously rotating shafts detachably connected with means on the shafts of the end casings for imparting motion thereto when said casings are assembled.

5. A sectional power unit composed of three box-like casings capable of being arranged along the side of one another, the central casing having removable sides, the end casings being provided with openings adapted to register with the open sides of said casing when the removable sides are detached to form a sectional oblong casing, a plurality of parallel arranged shafts disposed in said casings and extending out the ends thereof to provide driving connections therewith, a driving and a driven shaft arranged in the central casing and adapted to be continuously rotated at different rates of speed and a shaft in each of said casings and mechanism on the driven shaft cooperating with mechanism on the shafts of each of the end casings for imparting intermittent rotary movement to one of said shafts and an oscillatory motion to the other shaft when said casings are assembled.

6. In a sectional power unit comprising an electric motor provided with a vertically disposed shaft, a main casing disposed above said motor in which said shaft extends, a worm fixed on said shaft, a pair of shafts journaled in said casing and projecting outwardly therefrom to provide driving connections therefrom, said shaft carrying meshing gears of different sizes and adapted to be rotated continuously at different rates of speed, a worm wheel carried by one of said shafts meshing with said worm, an eccentric carried by the other of said shafts, an auxiliary casing adapted to be connected to the main casing, a shaft journaled in the auxiliary casing projecting outwardly therefrom to provide a driving connection therewith, a crank arm fixed on the last mentioned shaft and an eccentric strap surrounding said eccentric pivotally connected to said crank arm for converting rotary movement into oscillatory motion when said casings are assembled.

7. A sectional power unit comprising a main casing, auxiliary casings adapted to be detachably connected thereto, the main casing having a pair of continuously driven high and low speed rotating driving shafts, one auxiliary casing having an intermittently rotating driving shaft provided with operating means having a detachable driving connection with the low speed continuously rotating shaft and the other auxiliary casing having an oscillating driving shaft provided with operating means having a detachable driving connection with the high speed shaft when said sections are assembled.

ALBERT G. REDMOND.